Feb. 18, 1958
R. B. TILNEY ET AL
2,824,273
AUTOMATIC MOTOR CONTROL CIRCUIT
Filed Oct. 19, 1953
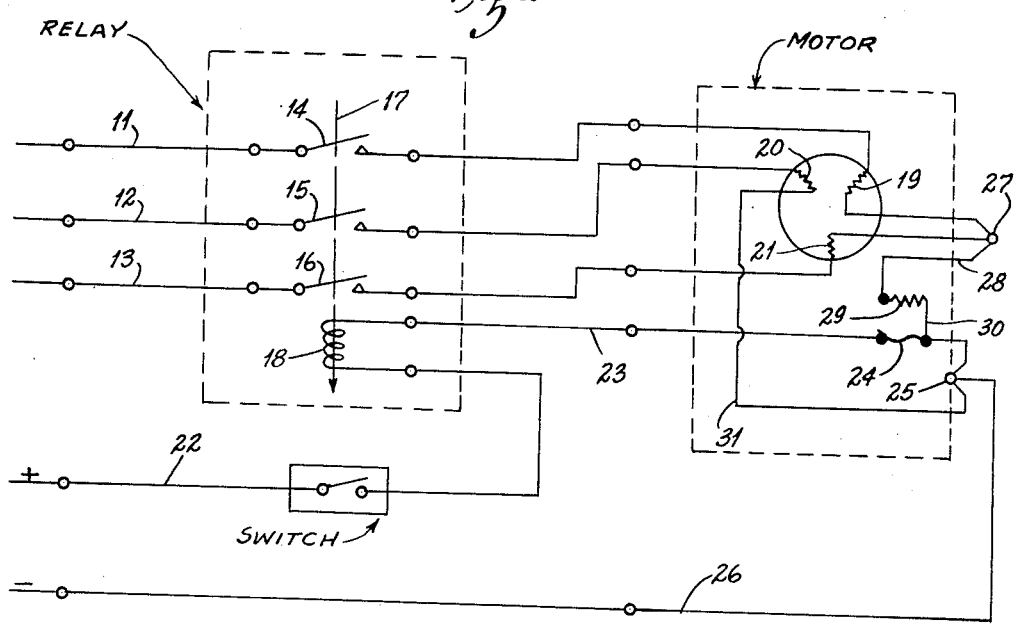
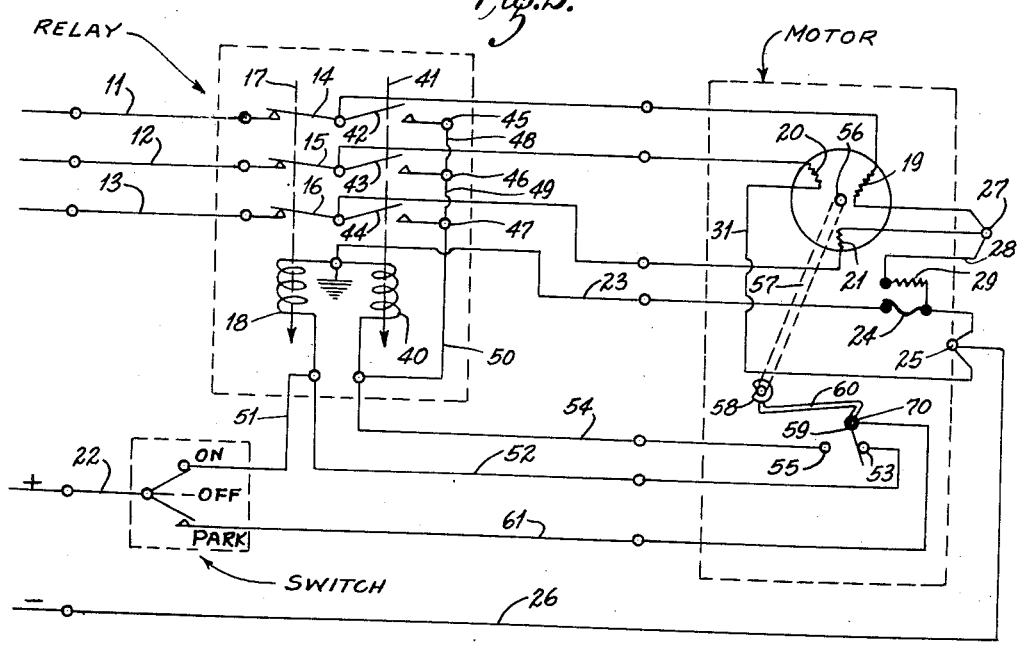
INVENTORS:
RALPH B. TILNEY,
JOSEPH F. CUBA,
BY Kingsland, Rogers & Ezell
ATTORNEYS United States Patent Office 2,824,273
Patented Feb. 18, 1958

2,824,273

AUTOMATIC MOTOR CONTROL CIRCUIT

Ralph B. Tilney, Clayton, and Joseph F. Cuba, St. Louis, Mo., assignors to Alco Valve Company, University City, Mo., a corporation of Missouri Application October 19, 1953, Serial No. 386,786

2 Claims. (Cl. 318—212)

This invention relates to a motor control circuit, and, in particular, is concerned with an A. C. motor, such as the induction type, having an independent D. C. control circuit with automatic operating and controlling means therein.

By means of this invention, there has been provided an independent D. C. circuit for controlling an A. C. circuit to such a motor. This control circuit is so designed that a safety means including a thermoprotector element is arranged in the circuit of the motor, as well as the control circuit, for breaking off the source of A. C. power to the motor, when unsatisfactory conditions occur that would affect the operation of the motor. Where such conditions as motor overload, high ambient temperatures, and improper running of the motor are brought about, consequent overheating of the thermoprotector element will cause an interruption in the control circuit through the actuation of a bimetallic thermostatic element which, in turn, cuts off the source of A. C. current to the motor and prevents damage thereto.

Further, there has been provided means for stopping the motor in a preselected position so that the drive shaft to which it is connected may have its rotational movement stopped at a desired point. This has been effected by an automatic opening circuit which is connected to the D. C. control circuit in such a manner that when put in operation A. C. current is interrupted to the motor and D. C. current is applied thereto to effect a dynamic braking of the motor and immediate stopping. When this operation is brought about, means are provided for preventing any passage of D. C. current back into the A. C. supply source, so as to insure that the A. C. supply is not superimposed with any D. C. current, which is objectionable in certain cases.

The control circuit of this invention is of value in any three-phase induction type of A. C. motor where protection is desired against overheating and faulty operation of the motor. Where the motor is desired to be stopped in a certain position, the invention is applicable to any series universal or induction motor, be it three-phase, two-phase or single-phase. Particular advantage is had, however, where an induction motor is to be used with a windshield wiper which is desired to be stopped in a selected rest position. Such A. C. motor windshield wiper systems are of advantage in airplane use, and the invention will be described with relation thereto. It is to be understood that the scope is of broader application and can be used where desired, as will be obvious from the description below.

It is, therefore, a principal object of this invention to prvide a control circuit for controlling the supply of current to a motor wherein the control circuit has a thermo- protector element which is sensitive to ambient temperatures in the motor and current unbalances so as to control the current supply to the motor.

It is a further object of this invention to provide a control circuit for a motor to effect stopping of the motor in a preselected position and in rapid response to the operation of the control circuit.

It is another object of this invention to provide a three-phase induction motor with a D. C. control circuit in which a bimetallic heat-sensitive thermoprotector element is connected between the control circuit and the A. C. circuit of the motor such that high temperatures in the motor, overloads, and current unbalances between the individual phases will cause the bimetallic thermoprotector element to open the control circuit and so interrupt the A. C. supply to the motor.

It is yet another object of this invention to provide any A. C. induction or series universal motor with a D. C. control circuit having means for interrupting the supply of A. C. current to the motor and imposing a D. C. current thereto for dynamically braking the motor and stopping it in a preselected position in immediate response to the operation of the control circuit.

Yet another object of this invention is to provide a three-phase A. C. induction motor for use with windshield wipers, and having a control circuit connected to a D. C. current source with a heater element therein connected to a heat-sensitive element for protection of the motor against overloads, high temperatures, and current unbalances, together with means for operating the control circuit so as to impose a D. C. current upon the induction motor and dynamically brake the motor without the danger of introducing any D. C. current into the A. C. supply source.

Further objects of this invention will be readily apparent to those skilled in the art in connection with the detailed description which follows below.

Reference will now be had to the attached drawings illustrating a typical embodiment of this invention, in which:

Fig. 1 is a schematic diagram showing a D. C. control circuit connected to a three-phase A. C. induction motor; and Fig. 2 is a schematic diagram showing a D. C. control circuit connected to a three-phase A. C. induction motor similarly to Fig. 1, but, in addition, showing the automatic opening circuit for stopping the motor in a preselected position.

Referring now to the drawings, Fig. 1 shows a circuit for connecting together a switch, relay, and a motor according to the teaching of this invention. The relay, which is a three-pole, single-throw relay, is connected to a three-phase A. C. source through leads 11, 12 and 13, which communicate respectively with contacts 14, 15 and 16. Actuation of these contacts is effected through an armature 17, which is movable in response to the energization of a relay coil 18. The three-phase source of A. C. electrical supply is introduced into a motor having three-phase primary windings 19, 20 and 21.

A D. C. source of energy is connected to the relay coil 18 through a conventional two-position switch by an electrical lead 22 which leads to a positive D. C. terminal The other side of the relay coil is connected through lead 23 to a bimetallic heat-sensitive element or thermoprotector 24 within the motor. The other side of the thermoprotector element 24 is connected to a grounded terminal post 25 which is in communication with a negative D. C. terminal via lead 26.

In the motor, windings 19 and 21 of the three-phase A. C. induction motor are connected to a neutral point shown as terminal post 27. The terminal post 27 is also connected by lead 28 to a resistor heater element 29 which is in contact at its other end with the bimetallic element through lead 30. The third winding 20 of the motor is connected through lead 31 to the terminal post 25 which completes the circuit through lead 26 to the negative terminal.

The schematic diagram of Fig. 2 includes the same essential circuit of Fig. 1, and like elements are given the same reference numerals therein. In addition, the schematic diagram of Fig. 2 includes an automatic parking circuit such that the motor will come to rest in a preselected position upon operation of a motor switch. As in Fig. 1, a relay having contacts of the tandem type is connected to a three-phase source of A. C. current through leads 11, 12 and 13, which are connected respectively to contacts 14, 15 and 16. These contacts are adapted to be operated simultaneously by the movement of the armature 17 in accordance with the energization of the relay coil 18. A second relay coil 40 is likewise provided with an armature 41 which is adapted to operate contacts 42, 43 and 44.

The contacts 14 and 42 are rigidly connected in tandem to a pivot point such that when one is operated the other is non-operated. This prevents current from flowing between lead 11 and contact post 45 at the same time. Contacts 15, 43 and 16, 44 are similarly connected.

Winding 19 of the three-phase induction motor is connected to a common post between contacts 14 and 42, and, similarly, winding 20 is connected to contacts 15 and 43, as is also the case with winding 21 which is connected between contacts 16 and 44. Contacts 42, 43 and 44 are connected to posts 45, 46 and 47, respectively, all of said posts being jumpered together by jumpers 48 and 49. If desired, however, jumpers 48 and 49 may be eliminated, in which event, upon operation of the control switch to the park position, braking will be effected by the superposition of D. C. current on only one phase of the motor instead of three, as will appear below. The lead 50 communicates post 47 with the lower side of the relay coil 40.

The control switch is connected to a positive source of D. C. current by lead 22, and the switch is movable to one of three positions which are "on," "off" and "park." The "on" contact is connected by lead 51 to the lower side of relay coil 18 from which point communication is had through lead 52 to contact 53 within the motor. The negative D. C. terminal is connected through lead 26 to the grounded terminal post 25 within the motor circuit. A lead 54 connects the lead 50 and the lower side of coil 40 with another contact 55 within the motor.

Within the motor the three-phase A. C. primary windings 19, 20 and 21 are connected to the terminal post 27, the heater element 29, and the thermoprotector element 24 in the same manner as described with respect to Fig. 1.

The automatic parking mechanism of the motor includes the shaft 56 of the motor which may be connected, as shown in dotted lines 57, by direct connection, pulley or other conventional manner, to a rotary cam 58. A parking switch 59 within the motor is adapted to be moved about a pivot 70 against either contact 53 or 55 according to the forceful engagement of a linkage 60 with the cam. The parking switch 59 is in communication through lead 61 with the "park" contact of the control switch.

The parking circuit has been illustrated for a three-phase motor where a safety circuit may also be included. Where it is desired, however, to use a two-phase, single-phase or series universal motor, the parking circuit may be used alone, in which event the circuit will be substantially identical to the parking circuit described in Fig. 2, with the exception that the thermoprotector circuit is eliminated and the extra leads to the additional phases of the three-phase motor are, of course, removed.

Operation

Fig. 1 shows the motor in the inoperative position due to the open switch. When the control switch is closed, D. C. current flows through the relay coil, through lead 23, bimetallic element 24, post 25, and back through lead 26 to complete the circuit. When the relay coil is thereby energized, the armature 17 is operated so as to close contacts 14, 15 and 16, which introduce the three-phase source of A. C. current to windings 19, 20 and 21, respectively. In conventional operation, the D. C. current supply may be from a 28 volt source, and the three-phase A. C. current supply may be 400 cycle and 208 volts. In the motor diagram, it can be seen that winding 20 is connected to lead 31, post 25, leads 30, to the heater element 29, and therefrom through lead 28 to post 27. Windings 19 and 21 also are in communication with post 27 directly. By this arrangement, a more or less constant balanced current is introduced to the heater element 29, which may be of a conventional nature and of the order of one ohm resistance. In normal operation, the current flowing through heater element 29 is of a small balanced value and will not generate heat to any appreciable degree.

The thermoprotector element 24 is so designed that should there be any appreciable degree of heat given off from the motor, which reaches a dangerous condition, it will operate as a conventional thermostat to open the circuit and open the contact with lead 23. When this occurs, the direct current through relay coil 18 is interrupted and the contacts 14, 15 and 16 will be opened to their non-operated position, causing the stopping of the three-phase induction motor.

Should, for any reason, the motor be operating but running improperly so as to cause sudden surges of current in the heater element 29, the heater element will rapidly heat up and transfer heat to the bimetallic element 24 so as to cause opening of the circuit until proper operation can be effected. For instance, if any one of the three-phase leads or winding connections is broken or interrupted, the attendant increase of current through the heater element 29 will cause operation of the bimetallic element as described above. This is also true where the motor is overloaded and similarly prevents overheating of the motor due to a locked rotor condition. Also, should a short circuit develop in the motor circuit, the immediate increase in current in the heater element 29 will protect the motor by causing operation of the bimetallic element.

It can be seen, therefore, that there has been provided a positive means for preventing damage to the motor by the safety circuit including the heater element and the bimetallic thermoprotector element which are connected into the winding of the three-phase induction motor. This protection insures against overheating of the motor due to any sudden current unbalances or overloads or slow heating up of the motor due to any cause whatsoever.

The operation of the circuit of Fig. 2 is similar to that described above for Fig. 1 with respect to the heater element and the bimetallic thermoprotector when the switch is operated to the "on" position shown in dotted lines. However, when the switch is thrown to the "park" position, D. C. current will flow, as shown in Fig. 2, from the positive source of D. C. supply in lead 22, through the switch to lead 61, and to the parking switch 59. The parking switch is caused to be in contact with contact 53 through the major portion of the rotation of shaft 56 in the motor because of the design of cam 58. This cam, which is rotated by the pulley or connection shown in dotted lines 57, causes the linkage 60 to close switch 59 until the recess in the cam contacts the linkage. In this normal position, current flows from the switch 59 and contact 53, through lead 52 and then to the bottom of relay coil 18 so as to cause operation of contacts 14, 15 and 16 in just the same manner as effected in the "on" position of the switch.

When, however, the indented portion of the cam comes in contact with the linkage 60, this linkage, which is caused to bear against the cam by conventional spring means or the like (not shown), causes the rotation of the switch 59 in a clockwise direction to come in contact with the contact post 55. When this occurs, the current through the relay coil 18 is interrupted to open contacts 14, 15 and 16. Simultaneously, the completion of the circuit through contact 55 and lead 54 to relay coil 40 causes the operation of armature 41 and the closing of contacts 42, 43 and 44. When this occurs, D. C. current will flow through lead 50 and each one of the jumpers 48 and 49, and through contacts 42, 43 and 44 to the windings 19, 20 and 21 of the three-phase induction motor so as to impose a D. C. current thereon. This D. C. current causes the motor to act as a generator and effects a dynamic braking of the motor so that it is almost instantaneously stopped.

Actually, it is sufficient for satisfactory operation if there be D. C. current flowing in only one of the coils so that jumpers 48 and 49 may be dispensed with if so desired. In dispensing with these jumpers, a power saving in D. C. current is effected.

It is seen, therefore, that in the parking circuit D. C. current is prevented from being superimposed upon the three-phase A. C. supply when it is introduced into the motor, since the contacts 14, 15 and 16 are opened at this time and prevent any such current flow. This is a particularly desirable feature where certain A. C. current instruments may be provided in communication with the three-phase A. C. supply, and which might be damaged by such stray direct current. This is particularly true in aircraft where the circuits of Figs. 1 and 2 are particularly well adapted to be used. In such circuits where the motor may be used for driving a windshield wiper, it is of advantage to have, in addition to the safety feature as described in Figs. 1 and 2 to prevent overheating or overloading of the motor, an automatic parking circuit so as to bring the motor and windshield wiper to stop in a preselected rest position, as described for Fig. 2.

The particular advantage of the parking circuit is that it prevents the feedback of any D. C. current through contacts 14, 15 and 16, since D. C. current can never be directed thereto because of the circuit layout and the construction of the tandem relay. It is to be observed that if, instead of the tandem three-pole, single-throw relay being used, a three-pole, double throw relay is employed, there would be the danger of short circuit that might be caused by dirty or pitted contacts building up, which would allow the harmful feedback of D. C. current to the A. C. source.

When the switch is operated to the "park" position, it can be seen, as has been described above, that once the indented portion of the cam 58 contact linkage 60 so as to cause the clockwise movement of the switch 59 against the contact 55, the dynamic braking of the motor will prevent any further movement of the motor and immediately stop it in that position. The switch 59 will be maintained against the contact 55 no matter how long the control switch is held in the "park" position.

Both the circuits of Fig. 1 and Fig. 2 are of special advantage in three-phase A. C. induction motor circuits where it is desired to provide a safe motor and effect an instantaneous and preselected stopping of the motor in a desired position of the motor upon proper operation of a parking switch. However, as has been previously pointed out, the parking circuit of Fig. 2 may be used with double- and single- or split-phase motors also. Broader application of both of these circuits will be readily apparent to those skilled in the art having the benefit of this description, and it is desired that such modifications and changes be within the scope of the claims of this invention as appended below.

What is claimed is:

1. A control circuit in a three-phase alternating current motor for stopping said motor in a preselected stop position, said control circuit including a control switch adapted to be connected to a direct current power supply, and a relay for connecting a three-phase alternating current power supply to said motor, said switch being further adapted to be connected to a park position for stopping said motor in the preselected stop position, said park position completing a circuit through a switch-operated means responsive to the rotational position of said motor for interrupting the alternating current supplied to said motor and introducing into said motor a direct current to dynamically brake said motor in said stop position, and means for positively preventing connection of the direct current power supply to the alternating current power supply when the direct current is introduced to the motor, said means including contact means operated by the aforementioned relay, said contact means being movable between a first position where the alternating current supply is connected to the motor and is opened from the direct current supply and a second position where the alternating current supply is opened from the motor and the direct current supply which are connected together.

2. A control circuit in a three-phase alternating current motor for stopping said motor in a preselected stop position, said control circuit including a control switch adapted to be connected to a direct current power supply, and a relay for connecting a three-phase alternating current power supply to said motor, said switch being further adapted to be connected to a park position for stopping said motor in the preselected stop position, said park position completing a circuit through a switch operated means responsive to the rotational position of said motor for interrupting the alternating current supplied to said motor and introducing into said motor a direct current to dynamically brake said motor in said stop position, said switch operating means including a cam rotatably associated with said motor, said cam being effective during a major portion of its rotation to complete the circuit through the relay for introducing alternating current to said motor and being effective during a minor portion of its rotation to complete a separate circuit through the switch operated means for interrupting said alternating current to said motor and imposing thereon a direct current through at least one of the windings in said motor, and means for positively preventing connection of the direct current power supply to the alternating current power supply when the direct current is introduced to the motor, said means including contact means operated by the aforementioned relay, said contact means being movable between a first position where the alternating current supply is connected to the motor and is opened from the direct current supply and a second position where the alternating current supply is opened from the motor and the direct current supply which are connected together.

References Cited in the file of this patent

UNITED STATES PATENTS

| | | |
|---|---|---|
| 2,304,599 | Rigby | Dec. 8, 1942 |
| 2,467,862 | Seely | Apr. 19, 1949 |
| 2,528,181 | Sacchini | Oct. 31, 1950 |
| 2,545,784 | Armstrong | Mar. 20, 1951 |
| 2,553,409 | Frank | May 15, 1951 |
| 2,560,288 | Harvey et al. | July 10, 1951 |